Jan. 15, 1924.
S. R. BERGMAN
1,480,892
COMMUTATOR DYNAMO ELECTRIC MACHINE
Filed Nov. 15, 1921
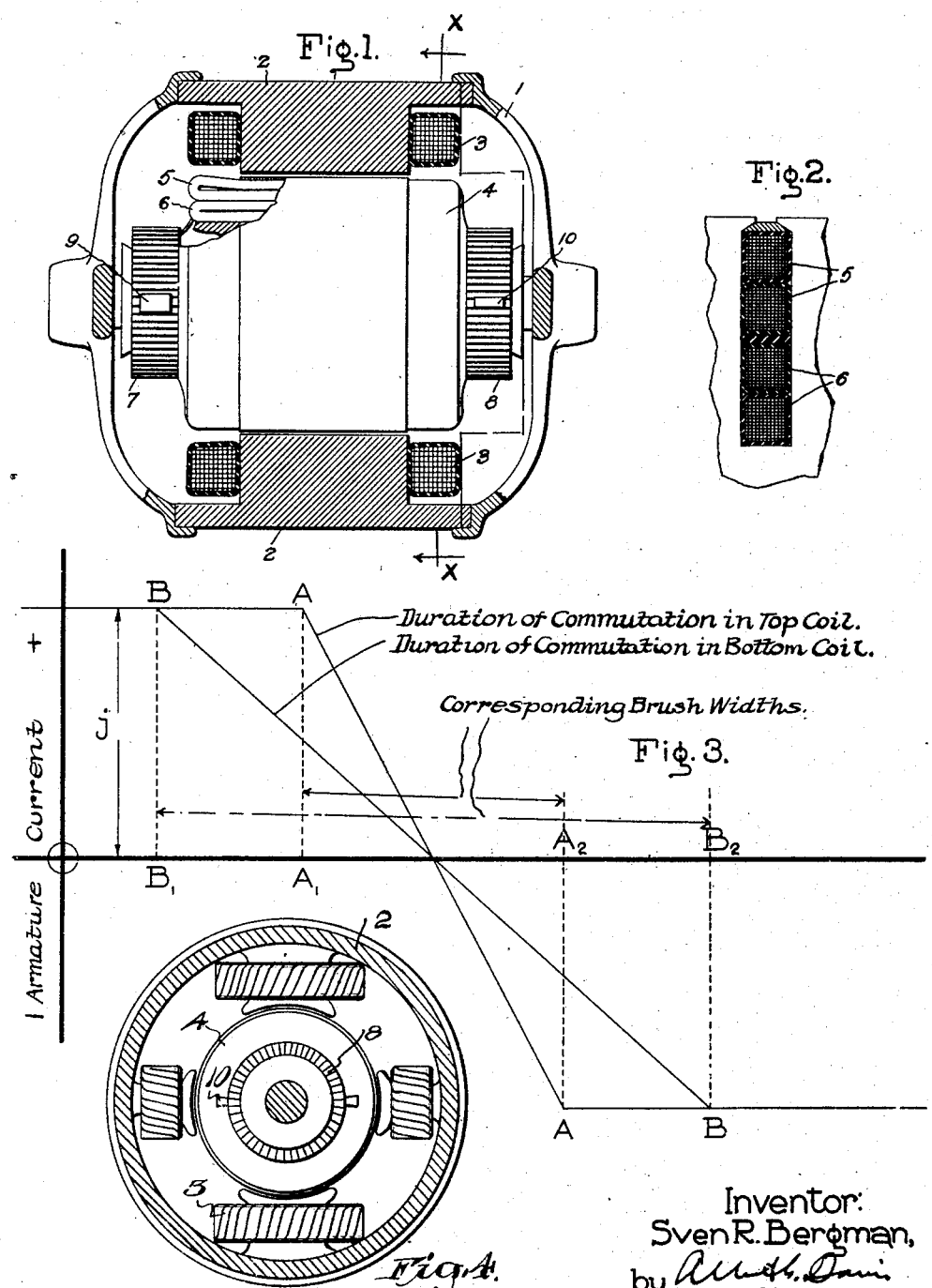
Inventor:
Sven R. Bergman,
by (signature)
His Attorney.

Patented Jan. 15, 1924.

1,480,892

UNITED STATES PATENT OFFICE.

SVEN R. BERGMAN, OF NAHANT, MASSACHUSETTS, ASSIGNOR TO GENERAL ELECTRIC COMPANY, A CORPORATION OF NEW YORK.

COMMUTATOR DYNAMO-ELECTRIC MACHINE.

Application filed November 15, 1921. Serial No. 515,403.

*To all whom it may concern:*

Be it known that I, SVEN R. BERGMAN, a subject of the King of Sweden, residing at Nahant, in the county of Essex, State of Massachusetts, have invented certain new and useful Improvements in Commutator Dynamo-Electric Machines, of which the following is a specification.

My invention relates to the commutation of dynamo electric machines and more particularly to a dynamo electric machine having a plurality of armature windings each connected to a separate commutator and revolving in a common field.

It often becomes desirable in a high voltage machine of the commutator type to use more than one winding on the armature, each winding being connected to separate commutators in order to keep the voltage per commutator bar to a permissible low value. In order to make each winding electrically and mechanically symmetrical and to utilize the core structure of the armature to the fullest extent it is important to have the separate windings laid in the same slots one on top of the other. With such a structure the leakage reactance of a bottom winding is much higher than the leakage reactance of a top winding and since the self-induction contained in any electric circuit delays any change in the current therein, it is obvious that during commutation the current in a bottom winding of such a structure will require longer to reverse than the current in a top winding, and consequently since all the windings are influenced by the same field, the conditions effecting commutation will not be the same for the top and bottom winding. If the distribution of flux in the armature core is such as to give perfect commutation for one winding, it will not be correct for the other winding. This is also true where a commutating field is used because a winding in the bottom of the slots will require a stronger commutating field than a winding in the top of the slots. As a matter of fact the commutating field should be proportional to the leakage reactance of each winding, but since the armature is assembled in one field it is impossible to have more than one strength of the commutating field. It is therefore obvious that if the commutating field is properly adjusted to commutate a bottom winding it is too strong for a top winding and produces what is called advanced commutation for the top winding. On the other hand, if the commutating field is properly adjusted for a top winding it becomes too weak to commutate properly a bottom winding and the commutation in the bottom winding then becomes too slow resulting in a retarded commutation for the bottom winding.

It is a well known fact that the leakage reactance in an armature winding is proportional to the square of the number of turns in each winding. It has heretofore been proposed to solve the commutation problem above discussed by distributing the windings in such a way that a top winding contained more turns than a bottom winding so as to make the leakage reactance in the two windings equal. Such a solution is not suitable for high voltage machines for the reason that the induced electromotive force in the top winding becomes larger than in the bottom winding and hence, the voltage between the commutator bars for the top winding becomes larger than for the bottom winding resulting in a distribution not suitable for a high voltage machine. Furthermore such a method can not be used where the windings are made up of bars, since then it becomes impracticable to use different numbers of turns per coil.

It is the object of my invention to obtain good commutation for top and bottom windings without the necessity of making the number of turns in the top winding greater than those in the bottom winding. I do this by the simple expedient of making the brushes on the commutators of such a thickness that the time during which a coil is being commutated is proportional to the time required for the current to reverse in the corresponding coil.

The scope of my invention will be pointed out in the appended claims and the manner in which the same may be applied will be understood more fully from the following description taken in connection with the accompanying drawings, in which: Fig. 1 represents a dynamo electric machine to which my invention has been applied; Fig. 2 shows the distribution of the windings in the armature slots, Fig. 3 shows the relation between the current in the armature windings and the time of reversal in the coils and Fig. 4 shows an end view of Fig. 1 taken on line X—X.

In Fig. 1 I have shown a dynamo electric machine partly in section having a frame work 1, main pole pieces 2 with field coils 3 wound thereon. As shown in Fig. 4 it is evident that commutating poles might to advantage be used midway between the main pole and adjacent the commutator brushes. The armature 4 carries two windings 5 and 6 wound in the same slots as illustrated in Fig. 2, the upper winding 5 comprising two sections and the lower winding 6 comprising two sections. The bottom winding 6 is connected to the commutator 7 as indicated in Fig. 1 and the top winding 5 is connected to the commutator 8 in the usual manner. Bearing on commutator 7 is a set of brushes one of which is shown at 9, and bearing on commutator 8 is another set of brushes one of which is indicated at 10. It will be noticed that the brush 9 which commutates the winding 6 in the bottom of the slot is considerably thicker and covers a relatively greater number of commutator bars than the brush 10 which commutates the upper winding 5.

As heretofore pointed out the current in the bottom coils 6 will require a relatively longer time to reverse during commutation than the current in the top coil 5 due to the increased inductance of the bottom winding and according to my invention I make the relative thickness of the commutator brushes, with respect to the width of the corresponding commutator bars, proportional to the time required to effect a reversal of current in the respective coils which they commutate, or in other words, proportional to the self-induction of the corresponding windings.

In Fig. 3 I have shown the relation between the current and the time of reversal in the coils. $j$ represents the maximum positive value of current which the coils will be required to reverse during commutation. Line A—A represents the reversal of the current in the top coil 5 and line B—B represents the reversal of current in the bottom coil 6. Assuming that the commutators are circumferentially similar as shown in Fig. 1, the width of the brush 10 for the top winding 5 will therefore be represented by line $A^1A^2$ and the width for brush 9 for the bottom winding 6 will be represented by the line $B^1B^2$. From this diagram it is seen that by making the brushes on the two commutators of the proper thickness proportional to the time required to commutate the current in their respective winding that the conditions for obtaining perfect commutation on both commutators will be fulfilled and good commutation will result. I have found that this invention applied to a 4 kilowatt 10,000 volt double commutator machine having about 100 volts per commutator bar gave very effective results, whereas it was impossible to regulate the strength of the commutating field so as to obtain perfect commutation for both commutators without this arrangement.

While the invention has been described in connection with a machine having two armature windings and two commutators it is evident that the invention is not limited thereto but that the same might be applied to machines with more than two armature windings each connected to separate commutators and provided with brushes having a thickness proportional to the time required to commutate the current in their corresponding coil. Although I have illustrated the commutators as being of equal diameter, it is evident that in certain cases it might be advantageous to make the commutators of different diameter and the respective commutator bars of correspondingly different widths, in which case I would make the relative width of the brushes to correspond. For example, in Fig. 1 if the commutator 7 had a diameter equal to one-half that of commutator 8 the brushes 9 and 10 would be of equal width. It is also evident that the same principle is involved irrespective of whether the machine is provided with commutating interpoles or not, and I intend to cover in the appended claims all such modifications as well as modifications not mentioned which come within the true spirit and scope of my invention.

What I claim as new and desire to secure by Letters Patent of the United States, is:—

1. In combination an armature for a dynamo electric machine having a plurality of windings of different leakage reactance, commutators for said windings, and brushes on said commutators, the brushes on the respective commutators having a thickness, with respect to the width of the corresponding commutator bars, proportional to the leakage reactance of the corresponding windings.

2. In combination an armature for a dynamo electric machine, slots in said armature core, a winding in the bottom of said slots, a second winding in the top of said slots, commutators for said windings and brushes on said commutators, the brushes on the commutator connected to the bottom winding being of greater thickness with respect to the width of the commutator bars than the brushes on the other commutator.

3. A high voltage, direct current dynamo electric machine comprising in combination a field structure having main and commutating poles, an armature structure having a plurality of windings of different leakage reactance thereon rotatably associated with respect to said field structure, commutators for said windings and brushes on said commutators, said brushes having a thickness, with respect to the width of the corresponding commutator bars, proportional to the leakage reactance of the windings with which they are electrically connected.

4. In combination an armature for a dynamo electric machine having a plurality of similar windings located at different depths in the armature core, commutators for said windings and commutating brushes thereon, said brushes having a thickness, with respect to the width of the corresponding commutator bars, proportional to the "depth" location of the windings with which they are electrically connected.

In witness whereof, I have hereunto set my hand this 12th day of November, 1921.

SVEN R. BERGMAN.